Patented Sept. 11, 1945

2,384,571

UNITED STATES PATENT OFFICE 2,384,571

RUBBERLIKE MULTIPOLYMERS PREPARED FROM MIXTURES INCLUDING A CONJUGATED DIENE HYDROCARBON

Waldo L. Semon, Silver Lake, Ohio, assignor to The B. F. Goodrich Company, New York, N. Y., a corporation of New York No Drawing. Application January 10, 1942, Serial No. 426,340

18 Claims. (Cl. 260—84.5)

This application is a continuation-in-part of my copending application Serial No. 322,383 filed March 5, 1940, and relates particularly to rubberlike multipolymers prepared by the polymerization of a mixture containing a conjugated diene hydrocarbon, an acrylic ester and an acrylic nitrile.

My copending application, referred to above, discloses that extremely valuable synthetic rubbers which are plastic and easily worked in the unvulcanized state and are mechanically strong and chemically resistant in the vulcanized state, may be obtained by polymerizing a mixture of monomeric materials containing a conjugated diene hydrocarbon and at least two other polymerizable materials which are members of the broad class consisting of acrylic esters and nitriles.

It has now been found that certain multipolymers, within this broad class, which are prepared from mixtures containing a conjugated diene hydrocarbon and at least two other polymerizable materials one of which is an acrylic nitrile and another of which is an acrylic ester of the formula

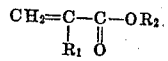

wherein $R_1$ is hydrogen or alkyl and $R_2$ is a hydrocarbon group, possess certain additional properties which make them particularly valuable synthetic rubbers. Thus, in addition to being plastic, soluble, and easily worked when unvulcanized and to being strong and resistant rubber-like materials when vulcanized, these multipolymers possess the important property of being flexible at temperatures much lower than the temperatures at which other rubber materials stiffen and become brittle. They are, therefore, of great value in automotive and aircraft applications where extremely low temperatures are encountered. Moreover, these multipolymers retain the excellent oil resistance characteristics of the two component copolymers of conjugated dienes and acrylic nitriles.

The particular compounds and their respective proportions present in the mixtures which are polymerized to form these valuable multipolymers may be varied considerably. It is essential, however, that at least three polymerizable constituents be present in the mixture, namely (1) a conjugated diene hydrocarbon of the formula

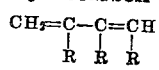

wherein R is hydrogen or methyl such as butadiene, isoprene, dimethyl butadiene piperylene or the like (2) an acrylic nitrile such as acrylonitrile, methacrylonitrile, ethacrylonitrile or the like and (3) an acrylic ester of the formula

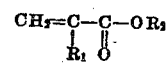

wherein $R_1$ represents hydrogen or alkyl and $R_2$ represents a hydrocarbon group. Suitable acrylic esters of this type include the alkyl acrylates wherein $R_1$ is a hydrogen and $R_2$ is alkyl, such as methyl acrylate, ethyl acrylate, n-propyl acrylate, isopropyl acrylate, butyl acrylate, amyl acrylate, hexyl acrylate, 2-ethyl hexyl acrylate, n-octyl acrylate, duodecyl acrylate and the like; similar alkyl esters of alkyl substituted acrylic acids, wherein $R_1$ is alkyl and $R_2$ is alkyl, such as methyl methacrylate, ethyl methacrylate, ethyl ethacrylate, methyl alpha-butylacrylate and the like; and other esters of this type, wherein $R_1$ is hydrogen or alkyl and $R_2$ is some other hydrocarbon group, such as cyclohexyl acrylate, methallyl acrylate, allyl methacrylate, benzyl acrylate and the like. It is also essential that the mixture to be polymerized contain at least 50% by weight of a conjugated diene hydrocarbon or of a mixture of conjugated diene hydrocarbons.

The preferred multipolymers are those prepared from mixtures containing at least 50% by weight of a conjugated diene, at least 5% by weight of an acrylic nitrile and at least 5% by weight of an alkyl acrylate. Particularly, the multipolymers prepared from mixtures containing from 50 to 80% by weight of butadiene, from 10 to 40% by weight of acrylonitrile and from 10 to 40% by weight of an alkyl acrylate containing less than 10 carbon atoms in the alkyl group have been found to possess the most valuable properties. It is to be understood, however, that valuable synthetic rubbers possessing flexibility at low temperatures may be prepared from any mixture of polymerizable materials containing at least 50% by weight of at least one conjugated diene hydrocarbon, at least one acrylic nitrile and at least one acrylic ester of the above described type. It is also to be understood that the mixture may contain, in addition to one or more specific compounds in each of the three above mentioned essential types of compounds, other polymerizable materials such as vinyl compounds, styrene, chloroprene, etc.

In the practice of this invention, the polymerization of these monomer mixtures to form synthetic rubber is preferably carried out in aqueous emulsion although other polymerization methods such as polymerization in homogenous system by the action of heat, light, pressure or catalysts may also be employed. In the emulsion polymerization process the mixture of monomers is emulsified in water by the use of a suitable emulsifying agent to form an aqueous emulsion to which is added, preferably, one or more polymerization initiators to start the polymerization reaction, one or more polymerization accelerators to speed up the reaction and one or more polymerization modifiers to improve the quality of the product. The emulsion is then agitated at a temperature of about 20–80° C. for a time sufficient to complete the polymerization, about 10 to 100 hours usually being required. The polymerization product, which is obtained in the form of an aqueous dispersion resembling natural rubber latex is then stabilized by the addition of an age resistor or antioxidant such as phenyl beta naphthylamine and is then coagulated by the same methods used to coagulate natural rubber latex, for example, by addition of acid, alcohol or salts or by a combination of these methods. Washing and drying of the coagulum produces a crude synthetic rubber which resembles crude natural rubber in appearance and in properties.

The preferred emulsifying agent for use in the above process consists of a water soluble soap derived from a fatty acid containing between 10 and 20 carbon atoms, such soaps as the sodium or potassium salts of lauric, myristic, palmitic, oleic or stearic acids being quite suitable. It is usually desirable to employ the soap as an aqueous solution containing some free fatty acid, that is to emulsify the monomers with an aqueous solution containing a fatty acid which has been 70 to 95% neutralized with alkali, but it is also possible to employ solutions of soap which are completely neutralized or even solutions of soaps containing free alkali. Moreover, other emulsifying agents such as salts of organic bases containing long carbon chains, for example trimethyl cetyl ammonium sulfate, or alkali metal alkyl sulfates, for example, sodium lauryl sulfate, and aryl sulfonates, for example, sodium isobutyl naphthalene sulfonate, may also be employed.

Polymerization initiators which may be used in the emulsion polymerization process include the per-oxygen type compounds (sometimes called polymerization catalysts) such as hydrogen peroxide, benzoyl peroxide, ammonium persulfate, sodium perborate, potassium persulfate, potassium percarbonate and the like as well as other types of initiators such as diazoaminobenzene, dipotassium diazomethane disulfonate and triphenylmethyl azobenzene. The preferred polymerization accelerators, or catalysts, are heavy metal compounds which are added in small amounts to the emulsion either as simple ionizable heavy metal salts such as ferrous sulfate, cobalt chloride, nickel nitrate or the like, as disclosed in the copending application of William D. Stewart, Serial No. 379,712, filed February 14, 1941, or in form of a redox system comprising a heavy metal in complex combination or otherwise associated with some other material such as sodium pyrophosphate, levulinic acid, glycine, cystine, beta-mercaptoethanol, quebrachitol and cholesterol, as disclosed in the copending applications of William D. Stewart, Serial No. 379,713 to 379,717 filed February 14, 1941. Polymerization modifiers which are also preferably present during the polymerization are usually sulfur containing organic compounds such as the dialkyl dixanthogens, the higher tetralkyl thiuram mono-, di-, and polysulfides, the 2-mercapto-alkyl thiazoles and the like.

Other polymerization initiators, catalysts, accelerators and modifiers as well as other substances variously known as polymerization regulators, promoters, etc., which enable the polymerization to be carried out in a shorter time and at a lower temperature and/or which in some manner improve the quality of the products obtained may also be included in the emulsion before polymerization. All of these added substances are mentioned only to indicate that best results are obtained when one or more of them are present, and it is not to be inferred that the monomer mixtures may not be polymerized in their absence.

The method of preparing the multipolymers of this invention and the properties which they possess may further be illustrated by the following specific examples in which the parts, unless otherwise indicated, are by weight.

Example I

A monomeric mixture consisting of 55 parts of butadiene, 25 parts of acrylonitrile and 20 parts methyl acrylate is emulsified with about 250 parts of a 2% aqueous solution of myristic acid which has been 85% neutralized with sodium hydroxide to form an aqueous emulsion. 0.35 part of hydrogen peroxide, as a polymerization initiator, 1.0 part of sodium ferri pyrophosphate, as a polymerization accelerator, and 0.6 part of diisopropyl dixanthogen, as a polymerization modifier, are then added to the emulsion and the emulsion is agitated at a temperature of 30° C. After 22 hours the polymerization is complete and a latex-like dispersion is formed. A small amount of phenyl beta naphthylamine is added to the dispersion and the dispersion is then coagulated with a salt solution. A rubber-like multipolymer resembling crude natural rubber is thus obtained. The multipolymer is plastic, may be milled and otherwise processed without difficulty and is easily and completely soluble in benzene and acetone. It may be compounded with pigments, softeners, vulcanizing ingredients, etc., in substantially the same manner as natural rubber.

When this multipolymer is compounded in a standard tire tread recipe and then vulcanized an excellent vulcanizate is obtained. It possesses a tensile strength of over 4000 lbs. and an ultimate elongation of about 750%. When exposed to low temperatures it remains soft and flexible at temperatures as low as −35° C. Moreover, it possesses excellent oil resistance, undergoing only a 14% volume increase when immersed in mineral oil for two weeks at 80° C.

A two component copolymer at 55 parts butadiene and 45 parts acrylonitrile prepared in identically the same manner does not possess these valuable properties. It, for example, is much less plastic, more difficult to mill and is only about 65% soluble in benzene or acetone. Moreover, its vulcanizate becomes brittle at a temperature of only −17.5° C.

Example II

The following monomer mixture

| | Per cent by weight |
|---|---|
| Butadiene | 55 |
| Acrylonitrile | 40 |
| Ethyl acrylate | 5 | is polymerized as in Example I, to form a synthetic rubber which is plastic and soluble and yields a vulcanizate having a very low freezing point. A comparison with the 55/45 butadiene acrylonitrile copolymer follows:

|  | Solubility in acetone | Freezing point |
| --- | --- | --- |
|  | Percent | °C. |
| 55/45 butadiene acrylonitrile copolymer | 68 | −17.5 |
| 55/40/5 butadiene acrylonitrile ethyl acrylate multipolymer | 100 | −25 |

The oil resistance and tensile properties of the two materials are both excellent and are substantially the same.

*Example III*

A multipolymer is prepared, as in Example I, from a monomer mixture containing 55% by weight of butadiene, 15% by weight of acrylonitrile and 30% by weight of butyl acrylate. In 40 hours an 88% yield of a plastic soluble synthetic rubber which has an extremely low freezing point, namely −55° C., is obtained. The tensile properties and oil resistance of its vulcanizate are also excellent.

*Example IV*

A mixture containing:

| | Parts |
| --- | --- |
| Butadiene | 55 |
| Acrylonitrile | 20 |
| Methyl methacrylate | 20 | are polymerized as in Example I. A plastic soluble synthetic rubber which yields vulcanizates having a low freezing point and excellent mechanical properties is obtained.

*Example V*

A multipolymer is prepared by the polymerization in aqueous emulsion of a mixture containing 75% by weight of butadiene, 15% by weight of acrylonitrile and 10% by weight of butyl methacrylate. This multipolymer is plastic and soluble, it possesses a low freezing point and it may be vulcanized to form excellent vulcanizates.

*Example VI*

Example IV is repeated except that benzyl acrylate is employed in place of methyl methacrylate. A good yield of a synthetic rubber having properties substantially equivalent to the rubber described in Example IV is obtained.

*Example VII*

Example IV is again repeated except that methallyl methacrylate is employed in place of methyl methacrylate. A good yield of a plastic, soluble synthetic rubber is obtained. This synthetic rubber is also flexible at low temperatures and yields strong resistant vulcanizates.

The above specific examples have been cited only for purposes of illustration and it is not intended that the invention be limited solely thereby for it is to be understood that wide variation in the nature and proportions of the materials polymerized and in the polymerization conditions employed may be effected without departing from the spirit and scope of the invention as defined by the appended claims.

I claim:

1. The process which comprises subjecting to polymerizing conditions a monomer mixture containing as much as about 50% by weight of a conjugated diene hydrocarbon of the formula

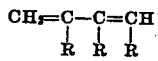

wherein each R represents a member of the class consisting of hydrogen and methyl, as much as about 5% by weight of acrylonitrile, and as much as about 5% by weight of an acrylic ester of the formula

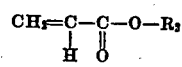

wherein $R_2$ is a hydrocarbon radical containing no more than 12 carbon atoms.

2. The process which comprises polymerizing in aqueous emulsion a monomer mixture containing from about 50 to 80% by weight of a conjugated diene hydrocarbon of the formula

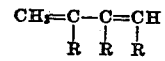

wherein each R represents a member of the class consisting of hydrogen and methyl, from about 10 to 40% by weight of acrylonitrile and from about 10 to 40% by weight of an acrylic ester of the formula

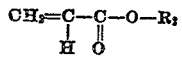

wherein $R_2$ is a hydrocarbon radical containing no more than 12 carbon atoms.

3. The process which comprises polymerizing in aqueous emulsion a monomer mixture containing from about 50 to 80% by weight of butadiene-1,3, from about 10 to 40% by weight of acrylonitrile and from about 10 to 40% by weight of an alkyl acrylate containing less than 10 carbon atoms in the alkyl group.

4. The process which comprises polymerizing in aqueous emulsion a monomer mixture containing from about 50 to 80% by weight of butadiene-1,3, from about 10 to 40% by weight of acrylonitrile and from about 10 to 40% by weight of methyl acrylate.

5. The process which comprises polymerizing in aqueous emulsion a monomer mixture containing from about 50 to 80% by weight of butadiene-1,3, from about 10 to 40% by weight of acrylonitrile and from about 10 to 40% by weight of ethyl acrylate.

6. The process which comprises polymerizing in aqueous emulsion a monomer mixture containing from about 50 to 80% by weight of butadiene-1,3, from about 10 to 40% by weight of acrylonitrile and from about 10 to 40% by weight of butyl acrylate.

7. The process which comprises polymerizing in aqueous emulsion in the presence of an emulsifying agent, a polymerization initiator, a polymerization catalyst and a polymerization modifier a monomer mixture containing from 50 to 80% by weight of butadiene-1,3, from 10 to 40% by weight of acrylonitrile and from 10 to 40% by weight of methyl acrylate.

8. The process which comprises polymerizing in aqueous emulsion in the presence of an emulsifying agent, a polymerization initiator, a polymerization catalyst and a polymerization modifier a monomer mixture containing from 50 to 80% by weight of butadiene-1,3, from 10 to 40% by weight of acrylonitrile and from 10 to 40% by weight of ethyl acrylate.

9. The process which comprises polymerizing in aqueous emulsion in the presence of an emulsifying agent, a polymerization initiator, a polymerization catalyst and a polymerization modifier a monomer mixture containing from 50 to 80% by weight of butadiene-1,3, from 10 to 40% by weight of acrylonitrile and from 10 to 40% by weight of butyl acrylate.

10. A rubber-like multipolymer prepared by the process of claim 1.

11. A rubber-like multipolymer prepared by the process of claim 2.

12. A rubber-like multipolymer prepared by the process of claim 3.

13. A rubber-like multipolymer prepared by the process of claim 4.

14. A rubber-like multipolymer prepared by the process of claim 5.

15. A rubber-like multipolymer prepared by the process of claim 6.

16. A rubber-like multipolymer prepared by the process of claim 7.

17. A rubber-like multipolymer prepared by the process of claim 8.

18. A rubber-like multipolymer prepared by the process of claim 9.

WALDO L. SEMON.